(12) United States Patent
Zhao et al.

(10) Patent No.: US 10,116,055 B2
(45) Date of Patent: Oct. 30, 2018

(54) Z-SHAPED DUAL RING WINDING TYPE NFC ANTENNA AND ANTENNA SYSTEM

(71) Applicant: Shenzhen Sunway Communication Co., Ltd, Shenzhen (CN)

(72) Inventors: Anping Zhao, Shenzhen (CN); Fuqiang Al, Shenzhen (CN); Wenfeng Yao, Shenzhen (CN)

(73) Assignee: SHENZHEN SUNWAY COMMUNICATION CO., LTD, Shenzhen (CN)

( * ) Notice: Subject to any disclaimer, the term of this patent is extended or adjusted under 35 U.S.C. 154(b) by 48 days.

(21) Appl. No.: 15/516,370

(22) PCT Filed: Aug. 26, 2016

(86) PCT No.: PCT/CN2016/096943
§ 371 (c)(1),
(2) Date: Mar. 31, 2017

(87) PCT Pub. No.: WO2017/133223
PCT Pub. Date: Aug. 10, 2017

(65) Prior Publication Data
US 2018/0048067 A1 Feb. 15, 2018

(30) Foreign Application Priority Data
Feb. 3, 2016 (CN) .......................... 2016 1 0075796

(51) Int. Cl.
*H01Q 1/00* (2006.01)
*H01Q 7/08* (2006.01)
*H04B 5/00* (2006.01)

(52) U.S. Cl.
CPC ............. *H01Q 7/08* (2013.01); *H04B 5/0043* (2013.01)

(58) Field of Classification Search
CPC ......... H01Q 7/08; H01Q 5/0043; H01Q 1/243
See application file for complete search history.

(56) References Cited

U.S. PATENT DOCUMENTS

| | | | |
|---|---|---|---|
| 2014/0035793 A1* | 2/2014 | Kato ...................... | H01Q 1/243 343/867 |
| 2014/0247192 A1* | 9/2014 | Ikemoto ............. | G06K 7/10237 343/788 |
| 2014/0253404 A1* | 9/2014 | Ikemoto ................... | H01Q 1/40 343/788 |

* cited by examiner

*Primary Examiner* — Dieu H Duong
(74) *Attorney, Agent, or Firm* — Ming Chow; Sinorica, LLC

(57) ABSTRACT

The present invention discloses a Z-shaped dual ring winding type NFC antenna, comprising a ferrite core which is formed by superposing a plurality of plate-like ferrite units, a first coil and a second coil. The first coil is wounded on the outer surface of the ferrite core in a Z shape, and the second coil is spirally wound along the vertical Z axis direction. The lower end of the ferrite core is connected with an antenna insulating layer. The lower end face of the antenna insulating layer is connected with external electrodes that include a first external electrode and a second external electrode. The head end of the first coil is connected with the first external electrode, and the tail end is connected with the head end of the first coil through a connecting conductor. The tail end of the second coil is connected with the second external electrode. The "engaged" superposition of the Z-shaped first coil and the second coil which is parallel to the upper surface of the ferrite core and the magnetic field components vertical to the PCB respectively generated by the first coil and the second coil further improve the antenna performance. The first coil and the second coil make full use of the space of the ferrite core, so that the whole NFC antenna has a relatively small size.

20 Claims, 5 Drawing Sheets

US 10,116,055 B2

Z-SHAPED DUAL RING WINDING TYPE NFC ANTENNA AND ANTENNA SYSTEM

TECHNICAL FIELD

The present invention relates to the technical field of NFC antennas, in particular to a Z-shaped dual ring winding type NFC antenna and an antenna system including the Z-shaped dual ring winding type NFC antenna.

DESCRIPTION OF THE RELATED ART

Recently, NFC (Near Field Communication) technology has drawn more and more attention, and has been applied to hand-held mobile devices. For applications with traditional NFC hand-held devices, an NFC antenna radiator is generally placed on a battery, and in order to reduce the negative effects of the eddy currents on the NFC antenna, which are generated on the battery (or other metallic materials) and are opposite to the current direction of the antenna itself, a ferrite layer which can separate the antenna coil from the battery is placed between the NFC antenna coil and the battery at the same time. To ensure the performance of the NFC antenna, the NFC antenna employing such design solution must meet certain size requirements. The antenna in the traditional NFC antenna solution is relatively large in size and therefore fails to meet the miniaturization demands of hand-held devices.

In order to fulfill the aim of reducing the size of NFC antennas, Murata Manufacturing Co., Ltd. has put forward a small-sized surface mounted (SMD) type NFC antenna solution in Chinese Patent CN103620869A, and displayed the specific applications of the solution in actual communication devices in Chinese Patent CN102959800B. Compared with the traditional NFC antenna solution, the biggest difference of such solution lies in that the traditional NFC antenna coil with a relatively large size (for example a typical coil size is 30 mm×40 mm) is spirally wound on a ferrite core with a very small size (the size of the ferrite core can be reduced to be equal to that of a common chip) to form a spiral tubular antenna. After the small-sized NFC antenna monomer is placed above and effectively coupled with a metal sheet (or a PCB), an eddy current with a positive effect is generated on the metal sheet to further improve the performance of the whole antenna system (including the surface mounted type NFC antenna and the metal sheet). Compared with the traditional large-sized NFC antenna solution, the NFC antenna solution put forward by the Murata Manufacturing Co., Ltd. has made a huge progress in the aspect of antenna size. However, such surface mounted type antenna has a defect: when the antenna monomer is placed on the PCB or metal sheet, the magnetic field generated on the antenna itself is vertical and orthogonal to the magnetic field generated by the effective eddy current which is generated on the metal sheet because of the special winding mode of the antenna coil on the ferrite. Due to such mutual orthogonal relationship of the magnetic fields, antenna monomers and the metal sheet within the whole antenna system fail to reach the optimally matched state. Therefore, it is necessary to make an improvement on the aforementioned surface mounted type NFC antenna and develop a small-sized surface mounted type NFC antenna which has high performance and can be optimally matched with the magnetic field generated by an eddy current which is generated on the metal sheet.

In conclusion, the current NFC antennas fail to combine small size and high performance and have poor application effects.

DETAILED CONTENTS OF THE INVENTION

The objective of the present invention is to provide a Z-shaped dual ring winding type NFC antenna, aiming at solving the problem that existing NFC antennas fail to combine small size and high performance in the prior art.

The present invention is achieved in the following way:

A Z-shaped dual ring winding type NFC antenna includes a ferrite core which is formed by superposing a plurality of plate-like ferrite units and extends along an X-Y plane, and two NFC antenna coils, namely a first coil and a second coil which are mutually connected and are wounded on the ferrite core, wherein the first coil is wound on the outer surface of the ferrite core in a Z shape along the projection direction of a Y axis; the second coil is spirally wound along the vertical Z axis. The lower end of the ferrite core is connected with an antenna insulating layer; the lower end face of the antenna insulating layer is connected with external electrodes that include a first external electrode and a second external electrode; the head end of the first coil is connected with the first external electrode, while the tail end is connected with the head end of the second coil through a connecting conductor; and the tail end of the second coil is connected with the second external electrode.

The first coil includes a plurality of bottom wire conductors which are positioned on the lower surface of the bottom plate-like ferrite unit and close to the end portion of the −X axis, a plurality of top wire conductors which are positioned on the upper surface of the top plate-like ferrite unit and close to the end portion of the +X axis, a plurality of left wire conductors which connect the left end portions of the bottom wire conductors and the left end portions of the top wire conductors, and a plurality of right wire conductors which connect the right end portions of the bottom wire conductors and the right end portions of the top wire conductors. The left wire conductors are formed by left conductors or left conductive holes that penetrate the left through-holes near the left ends of the bottom plate-like ferrite unit, the middle plate-like ferrite units and the top plate-like ferrite unit, and a first wire which is disposed near the left ends of the middle plate-like ferrite units. The right wire conductors are formed by right conductors or right conductive holes that penetrate the right through-holes near the right ends of the bottom plate-like ferrite unit, the middle plate-like ferrite units and the top plate-like ferrite units, and a second wire which is disposed near the right ends of the middle plate-like ferrite units.

The second coil includes a plurality of coil bodies which are disposed on the upper surface of the second bottom plate-like ferrite unit, the upper surfaces and/or the lower surfaces of the middle plate-like ferrite units, wherein one end of each of the coil bodies on the bottom plate-like ferrite unit is a tail end of the second coil, and is connected with the first external electrode, while the other end is a head end, connected with the tail end of each of the coil bodies on the second bottom plate-like ferrite unit through a vertical connecting conductor or a conductive through-hole which is disposed on a lateral side of the second bottom plate-like ferrite unit. The rest can be done in a similar way until the head end of the top coil body is connected with the tail end of the first coil through a vertical connecting conductor or a conductive through-hole which is disposed on the lateral side of the top plate-like ferrite unit.

Optimally, the antenna insulating layer is provided with two through-hole electrodes for connecting the NFC antenna coils and the external electrodes; the through-hole electrodes are connected with the NFC antenna coils; the two through-hole electrodes are correspondingly disposed on the first external electrode and the second external electrode; the through-hole electrode on the first external electrode and the through-hole electrode on the second external electrode are respectively connected with the head end of the first coil and the tail end of the second coil.

Optimally, the first coil includes a plurality of parallel wire conductors on each of the left side, right side, upper side and lower side; the wire conductors on the left side, right side, upper side and lower side are connected with the through-hole conductors in turn, forming a shaft winding at an included angle of 90+θ between the rotating shaft direction and the X axis direction of the ferrite core.

Optimally, the ferrite core includes a bottom plate-like ferrite unit, a plurality of middle plate-like ferrite units and a top plate-like ferrite unit.

Optimally, the first coil and the second coil are superposed on the left face and on the right face and are disposed in a staggered way; on the left face and right face, the first coil can be positioned on the outer side, while the second coil can be positioned on the inner side; or the first coil can be positioned on the inner side, while the second coil can be positioned on the outer side.

The present invention also provides an antenna system, including the aforementioned Z-shaped dual ring winding type NFC antenna, a substrate and a metal sheet, wherein the metal sheet is placed on the substrate, and the Z-shaped dual ring winding type NFC antenna is positioned on the metal sheet.

Optimally, along the length direction, the inner end of the Z-shaped dual ring winding type NFC antenna is disposed directly above the metal sheet, and the outer end of the Z-shaped dual ring winding type NFC antenna is disposed outside the metal sheet. Or, the outer end of the antenna is disposed at the position overlapped with the edge of the metal sheet.

Optimally, the antenna system has a plurality of Z-shaped dual ring winding type NFC antennas in mutual series connection, and the plurality of Z-shaped dual ring winding type NFC antennas in mutual series connection are respectively disposed on the metal sheet.

Optimally, the metal sheet is rectangular, and four Z-shaped dual ring winding type NFC antennas are provided, respectively disposed on four sides of the metal sheet.

The present invention also discloses a method for processing the Z-shaped dual ring winding type NFC antenna, wherein all coil bodies of the ferrite core on the X-Y plane are manufactured by silk printing metallic paste; conductive through-holes and conductive holes are bored on all related layers along the Z axis direction, and then the paste is poured into the holes and finally sintered at a high temperature, wherein the metallic paste is gold paste, silver paste or copper paste.

Compared with the prior art, the Z-shaped dual ring winding type NFC antenna of the present invention employs a ferrite core which extends along the X-Y plane, a first coil of the NFC antenna wherein the first coil is wound on the outer surface of the ferrite core in a Z shape along the projection direction of the Y axis, and a second coil of the NFC antenna which is wound on the ferrite core and is spirally wound along the vertical Z axis direction, so due to the existence of the Z-shaped NFC antenna coil, the NFC antenna monomer generates the magnetic field components B1-B1' vertical to the long axis direction (or PCB) besides the magnetic field components A-A' along the long axis direction of the ferrite core which is wound by the coil. Due to the existence of the second coil, the magnetic field components B2-B2' vertical to the PCB are also generated. The "engaged" superposition of the Z-shaped first coil and the second coil which is parallel to the upper surface of the ferrite core, and the magnetic field components vertical to the PCB respectively generated by the first coil and the second coil further improve the antenna performance, achieving a high performance effect. In addition, the first coil and the second coil are both wound on the outer surface of the ferrite core, fully utilizing the space of the ferrite core, so the whole NFC antenna has a relatively small size.

DESCRIPTION OF SEVERAL VIEWS OF THE ATTACHED DRAWINGS

DETAILED DESCRIPTION OF THE PRESENT INVENTION

To make the objectives, technical solution and advantages of the present invention more clear, the present invention is described in further detail with reference to the following attached drawings and embodiments. It should be understood that the embodiments depicted here are only illustrative, and do not limit the present invention.

The implementation of the present invention is described in detail in conjunction with specific embodiments.

Refer to FIGS. 1-11, which show preferable embodiments of the present invention.

The Z-shaped dual ring winding type NFC antenna provided by the embodiment of the present invention can be applied to antenna systems to provide mobile device clients with a surface mounted type NFC antenna which has high performance and a small size.

Figure 1:
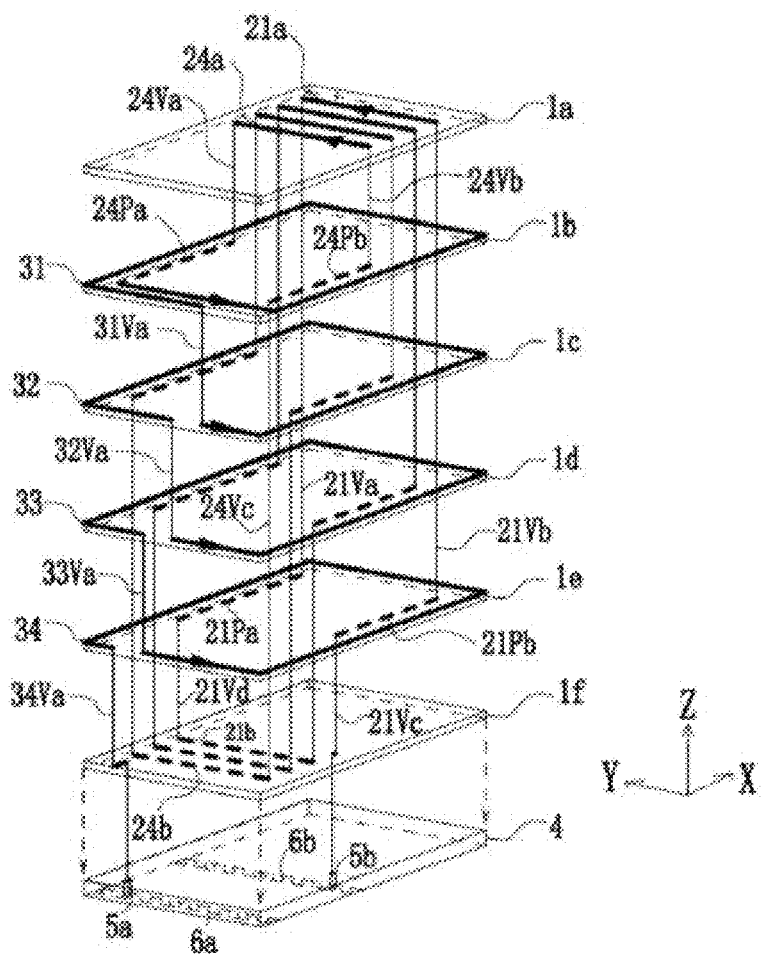
FIG. 1 is a schematic view of an exploded structure of a Z-shaped dual ring winding type NFC antenna provided in an embodiment of the present invention.

As shown in FIG. 1, a Z-shaped dual ring winding type NFC antenna includes a ferrite core 1 which is formed by superposing six layers of plate-like ferrite units 1a, 1b, 1c, 1d, 1e and 1f and extends along an X-Y plane, and two NFC antenna coils, namely a first coil 2 and a second coil 3 which are mutually connected and are wounded on the ferrite core. The first coil 2 is wound on the outer surface of the ferrite core 1 in a Z shape along the projection direction of the Y axis, and the second coil 3 is spirally wound along the vertical Z axis. The lower end of the ferrite core 1 is connected with an antenna insulating layer 4; the lower end face of the antenna insulating layer 4 is connected with external electrodes that include a first external electrode 6a and a second external electrode 6b; and the antenna insulating layer 4 is also provided with through-hole electrodes 5a and 5b which connect the NFC antenna coils and external electrodes. The head end of the first coil 2 is connected with the first external electrode 6b through the through-hole electrode 5b, while the tail end is connected with the head end of the second coil 3 through a connecting conductor 7 (namely a conductor playing a transitional connection role); the tail end of the second coil 3 is connected with the second external electrode 6a through the through-hole electrode 5a. The first coil 2 includes wires 21a-24a on the upper surface of the layer 1a and wires 21b-24b on the lower surface of the layer 1f; the wires (for example 21a) on the upper surface are connected with the wires (for example 21b) on the lower surface through the through-hole conductors (for example 21Va, 21Vb, 21Vc, 21Vd, etc.) and wire guide tubes (for example 21Pa, 21Pb) on the surfaces of the layers 1b, 1c, 1d and 1e. Specifically, 5b→21Vc→21Pb→21Vb→21a→21Va→21Pa→21Vd→21b form the wiring of one turn of the first coil (Z-shaped) (the structures of other turns of the first coil are similar to the aforementioned wiring mode). Wires 31, 32, 33, 34 of the second coil 3 are respectively distributed on the upper surfaces of the layers 1b, 1c, 1d, 1e, and are connected with the first coil 2 through through-hole conductors (for example 24Va, 24Vb, 24Vc; 31Va, 32Va, 33Va, 34Va) and the wire guide tube (for example 21Pb) on the surface of the layer 1b. Specifically, 24b→24Vc→24Pb→24a→24Va→24Pa→31→31Va→32→32Va→33→33Va≤34→34V a→5a form a connection between the second coil and the connection between the second coil and the first coil. Through the integrated connection of the first coil and the second coil, the Z-shaped dual ring winding type NFC antenna system is formed.

In this way, the bottom wire conductors 21b-24b and top wire conductors 21a-24a of the first coil 2 are respectively vertical to the Z axis; the left wire conductors and right wire conductors of the first coil 2 respectively form an inclined angle θ with the X axis; in particular, when the conductors of the first coil positioned on the bottom layer and the top layer of the ferrite core are mutually connected by a straight line on the left (or right) side of the ferrite, θ is the included angle between the straight line and the X axis, wherein arc tan(H/L)≤θ≤ arctan(H/(L/2)), H and L respectively represent the height and length of the ferrite core; thus, the winding of the first coil 2 represents a Z shape in the projection direction of the Y axis.

The Z-shaped dual ring winding type NFC antenna employs a ferrite core which extends along the X-Y plane, the first coil of the NFC antenna that is wounded on the ferrite core in a Z-shape, and the second coil of the NFC antenna that is wounded on the ferrite core and is spirally wound along the vertical Z axis, so the NFC antenna monomer generates magnetic field components B1-B1' vertical to the long axis direction (or PCB) besides the magnetic field components A-A' along the long axis direction of the ferrite core which is wound by the coils due to the existence of the Z-shaped NFC antenna coil, and also generates magnetic field components B2-B2' vertical to the PCB due to the existence of the second coil. The "engaged" superposition of the Z-shaped first coil and the second coil which is parallel to the upper surfaces of the ferrites and the magnetic field components B1-B1' and B2-B2' vertical to the PCB respectively generated by the first coil and the second coil further improve the antenna performance, achieving a high performance effect. In addition, the first coil and the second coil are both wound on the outer surface of the ferrite core, fully utilizing the space of the ferrite core, so the whole NFC antenna has a relatively small size.

Specifically, the external electrodes include a first external electrode 6a and a second external electrode 6b, wherein the first external electrode 6a and the second external electrode 6b are disposed on the lower side of the antenna insulating layer 4 at an interval; the first external electrode 6a is positioned at the outer end of the lower side of the antenna insulating layer 4, and the second external electrode 6b is positioned at the middle part of the lower side of the antenna insulating layer 4.

The second coil 3 is formed by coil bodies disposed on the upper surfaces and/or lower surfaces of the plate-like ferrite units. One or more turns of the coil bodies can be disposed on one surface. If disposed on adjacent surfaces, the coil bodies can be arranged in a staggered way. The first coil 2 and the second coil 3 are superposed on the left and right faces and need to be arranged in a staggered way. On the left and right faces, the first coil 2 can be positioned on the outer side, while the second coil 3 can be positioned on the inner side; or the first coil 2 can be positioned on the inner side, and the second coil 3 can be positioned on the outer side. Conductors for vertical connection are formed by filling conductive materials into the through-holes.

Figure 2:
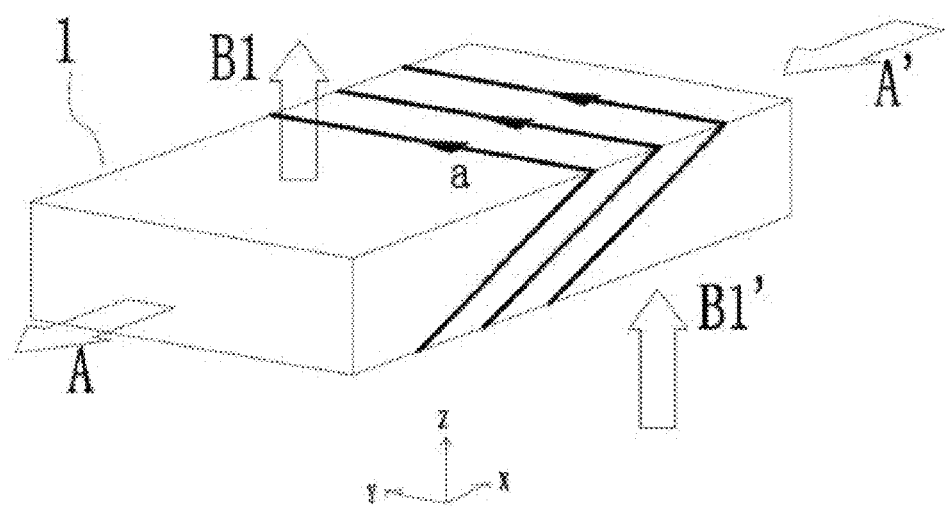
FIG. 2 is a schematic view of a three-dimensional structure of an NFC antenna only having a first coil provided in an embodiment of the present invention, wherein A-A' and B-B' represent two component directions of the magnetic field.
Figure 3:
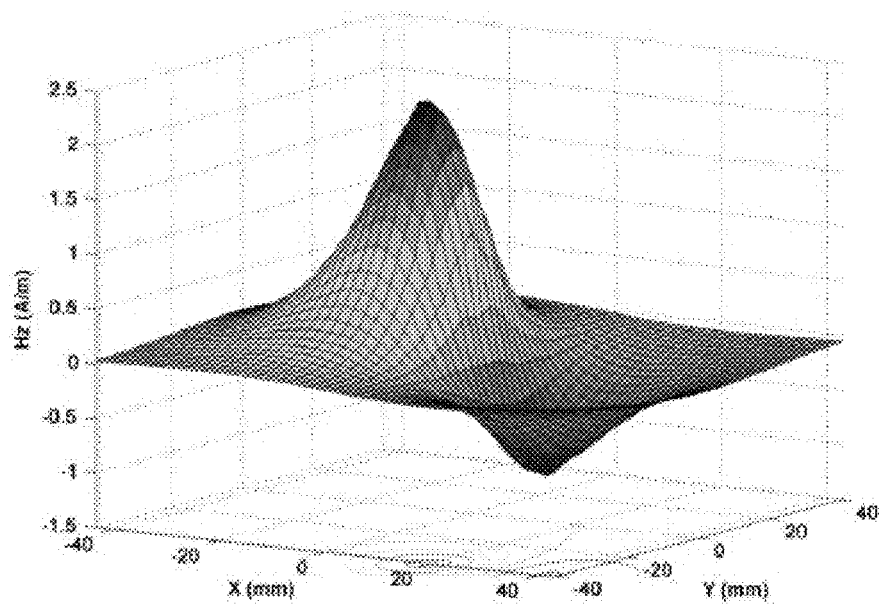
FIG. 3 is a layout of the Hz components of the magnetic field, at a position of 20 mm above a metal sheet in the Z axis direction, of the NFC antenna only having the first coil provided by an embodiment of the present invention.
Figure 4:
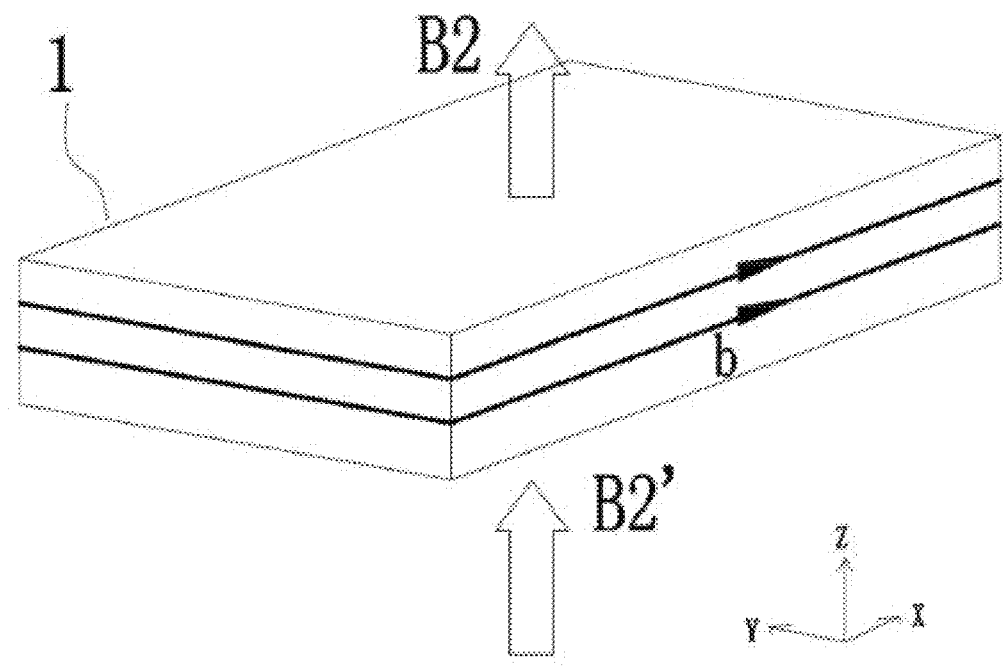
FIG. 4 is a schematic view of a three-dimensional structure of an NFC antenna only having a second coil provided in an embodiment of the present invention, wherein B2-B2' represent the direction of the magnetic field.
Figure 5:
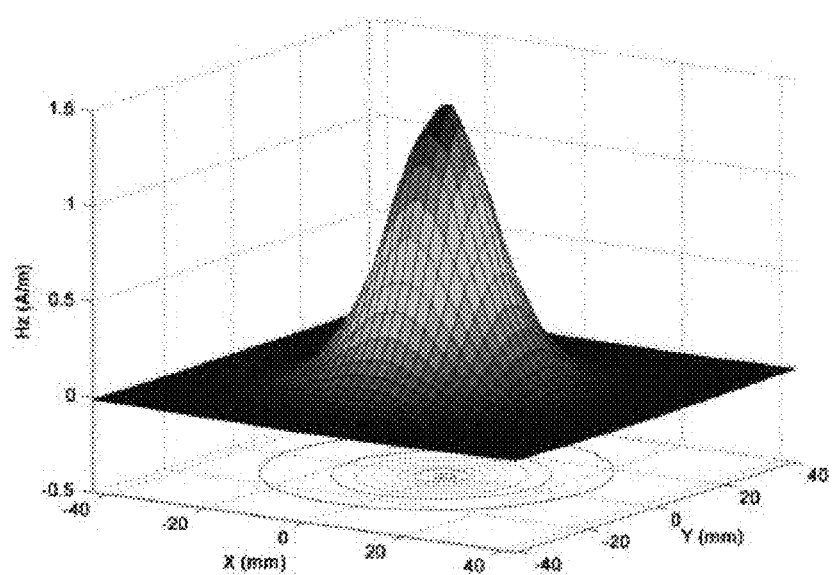
FIG. 5 is a layout of the Hz components of the magnetic field, at a position of 20 mm above a metal sheet in Z axis direction, of the NFC antenna only having the second coil provided by an embodiment of the present invention.
Figure 6:
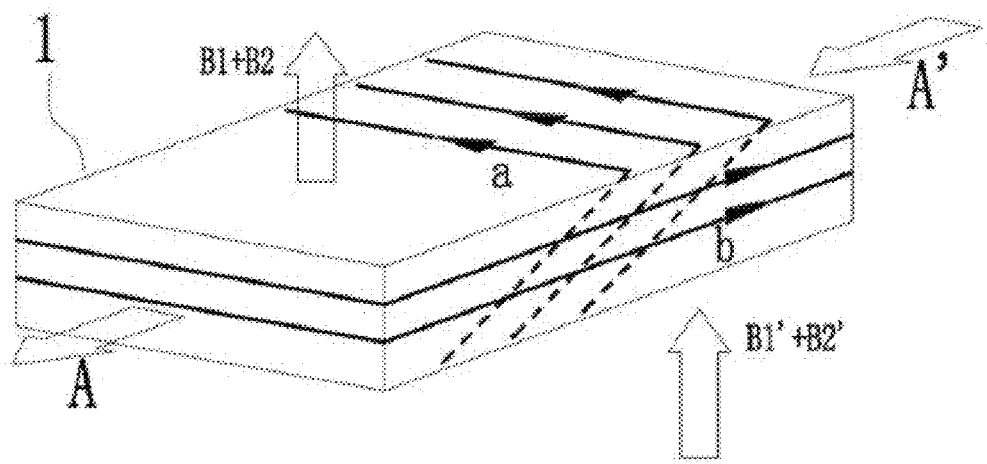
FIG. 6 is a schematic view of a three-dimensional structure of the Z-shaped dual ring winding type NFC antenna provided in an embodiment of the present invention.
Figure 7:
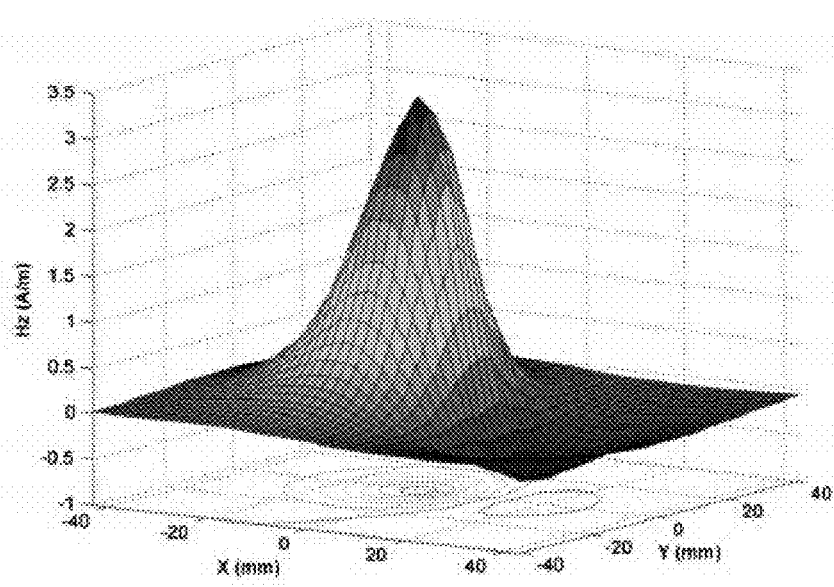
FIG. 7 is a layout of the Hz components of the magnetic field of the Z-shaped dual ring winding type NFC antenna at a position of 20 mm above a metal sheet in the Z axis direction according to an embodiment of the present invention.
Figure 8:
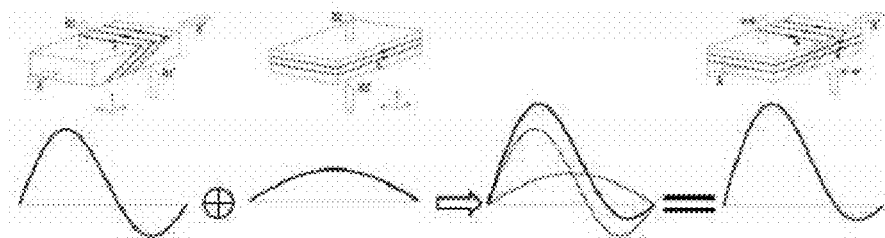
FIG. 8 is a working schematic diagram of a Z-shaped dual ring winding type NFC antenna monomer provided in an embodiment of the present invention.

To explain the working principle of the Z-shaped dual ring winding surface mounted type NFC antenna in the present solution, the dual ring winding wire is separated into an antenna monomer only having the first coil 2 and an antenna monomer only having the second coil 3. FIG. 2 is structural view of the antenna monomer only having the first coil 2, and FIG. 2 is schematic view that shows the current direction a of the antenna coil and the layout of the magnetic field components A-A' and B-B' of the antenna coil. FIG. 3 is a layout of the Hz components of the magnetic field generated by the antenna on a plane which is 20 mm above ferrite in the Z axis direction. From FIG. 3 it can be seen that the Hz components form positive and negative modes which are unequal in absolute amplitude values, and the performance in the mode where the amplitude value is positive is higher than that in the mode where the amplitude value is negative. This is because the magnetic field of the antenna has two components A and B1 and the strength of the component B1 is stronger than that of the component A. The reason why the strength of the component B1 is stronger than that of the component A is that the Z-shaped part (namely the first coil) of the antenna is wound along the length direction of the ferrite. FIG. 4 is a structural view of the antenna monomer only having the second coil 3, and FIG. 4 is also a schematic view that shows the current direction b and the layout of the magnetic field components B2-B2' of the antenna coil. FIG. 5 is a layout of the Hz components of the magnetic field generated by the ferrite on a plane which is 20 mm above the ferrite in the Z axis direction. From FIG. 5 it can be seen that the Hz components only form a positive amplitude mode. This is because the magnetic field of the antenna starts on the upper surface of the ferrite core and ends on the lower surface of the ferrite core, namely having one magnetic field component B2 only. FIG. 6 is a structural view of an antenna monomer having both the first coil and the second coil (namely the NFC antenna structure in the present solution). FIG. 6 is also a schematic view that shows the current direction a of the first coil, the current direction b of the second coil, and the layout of the magnetic field components A, (B1+B2) and A', (B1'+B2') of the antenna. FIG. 7 is a layout of the Hz components of the magnetic field generated by the antenna on a plane which is 20 mm above the ferrite in the Z axis direction. The layouts of the Hz components of the magnetic field as shown in FIGS. 3, 5 and 7 are obtained under the following conditions: the ferrite core has a size of 600 mm (L)×3 mm (W)×0.9 mm (H); the number of turns of the first coil is 5, while the second coil is 2; and the thickness of the insulating layer is 0.1 mm. The (absolute) amplitude value of a Hz components depends on the turns of the corresponding antenna coil; the more turns the antenna coil has, the bigger the (absolute) amplitude value of the mode generated is. From FIG. 7 it can be seen that the Hz components form the positive and negative modes where the absolute amplitude values are different; moreover, compared with the two modes in FIG. 3, the amplitude value is obviously increased in the mode where the amplitude value is positive (meanwhile, the amplitude is obviously decreased in the mode where the amplitude value is negative, but this mode is not the mode in practical use), which means that the antenna performance is obviously improved. Tests show that the reason why the special modes as shown in FIG. 7 are formed is the result of effective superposition, in space, of the two modes where the positive and negative amplitudes are unequal as shown in FIG. 3 and the mode where only the positive amplitude exists as shown in FIG. 5. The effective superposition of the magnetic fields in space is just the unique advantage of the dual ring winding surface mounted type NFC antenna put forward by the present solution, and the working principle of the effective superposition is simple and understandable when explained by using the expression form as shown in FIG. 8. From FIG. 8 it can be seen that when the first coil and the second coil are wound toward the current direction as shown in the figure, the amplitude in the positive mode of the antenna will be increased obviously (meanwhile, in the negative mode, the amplitude will be further weakened). However, if the current winding direction of the second coil is opposite to the existing direction, which means that the rotating shaft of the second coil does not point in the +Z direction, but in the −Z direction, the mode as shown in FIG. 5 turns from a positive value into a negative value. The superposition of the negative mode and the mode in FIG. 3 in space will weaken the amplitude value in the positive mode of the antenna, namely weakening the performance of the antenna. This represents that the current directions of the first coil and the second coil of the antenna in the present solution must meet certain requirements. Namely, the antenna performance can be improved only in the current directions a and b as shown in FIG. 6.

Figure 9:
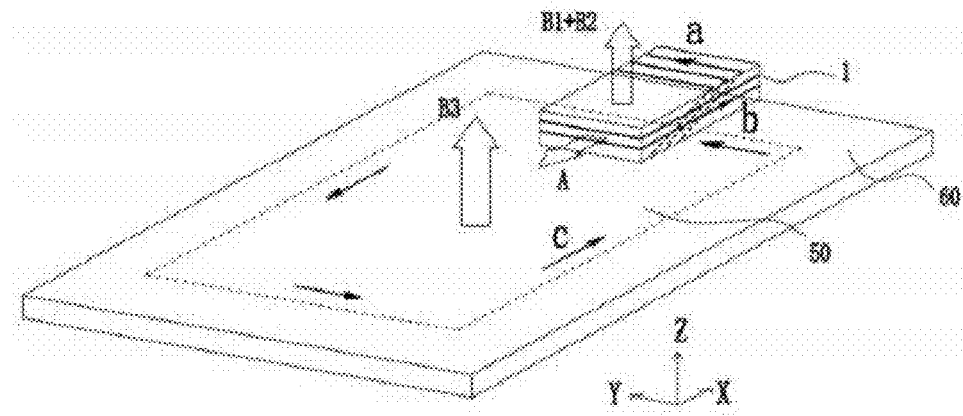
FIG. 9 is a working schematic diagram of an antenna system provided by an embodiment of the present invention.

The embodiment also provides an antenna system, as shown in FIG. 9, including the Z-shaped dual ring winding type NFC antenna, a substrate 60 and a metal sheet 50, wherein the metal sheet 50 is placed on the substrate 60; the Z-shaped dual ring winding type NFC antenna is positioned on the metal sheet 50; and the Z-shaped dual ring winding type NFC antenna can be entirely placed above the metal sheet 50. As shown in FIG. 9, when the current directions of the first coil and the second coil are respectively a and b, the antenna system is coupled with the metal sheet 50, and the metal sheet generates an effective eddy current c thereon. The eddy current c on the metal sheet is mainly generated by coupling of the wiring part of the first coil 2 on the surface of the ferrite core adjacent to the metal sheet (namely the lower surface of the ferrite); when the plate-like core unit if is made from non-ferrite materials, the wiring part of the second coil 3 on the front surface of the ferrite core also makes some contributions to the generation of the eddy current. The current directions of the two parts of the coils are the same (both −Y directions), so compared with the solution where the antenna only has the first coil, the present solution is advantageous in enhancement of the strength of the eddy current c, and then the strength of the magnetic field B3 along the +Z direction generated by the eddy current c of the metal sheet is enhanced. Besides, the NFC antenna monomer in the present solution not only has the field strength B1 along the +Z direction generated by the first coil, but also has the magnetic field B2 along the +Z direction generated by the second coil; and the effective combination of the magnetic field components B1, B2, B3 and A effectively improves the performance of the overall antenna system.

When the antenna monomer is exactly placed above the metal sheet 50, the magnetic field component vertical to the long axis direction is effectively superposed, in the same direction, with the magnetic field generated by the eddy loop which is coupled by the antenna coil on the metal sheet 50, thus further improving the performance of the overall antenna system.

Figure 10:
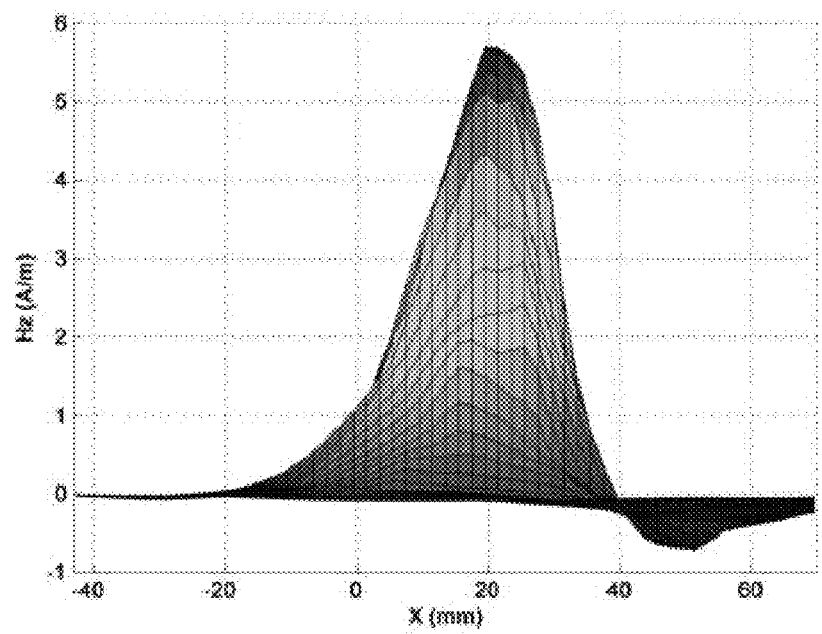
FIG. 10 is a layout of the Hz components of a magnetic field of the antenna system at a position of 20 mm above the metal sheet in the Z axis direction according to an embodiment of the present invention.
Figure 11:
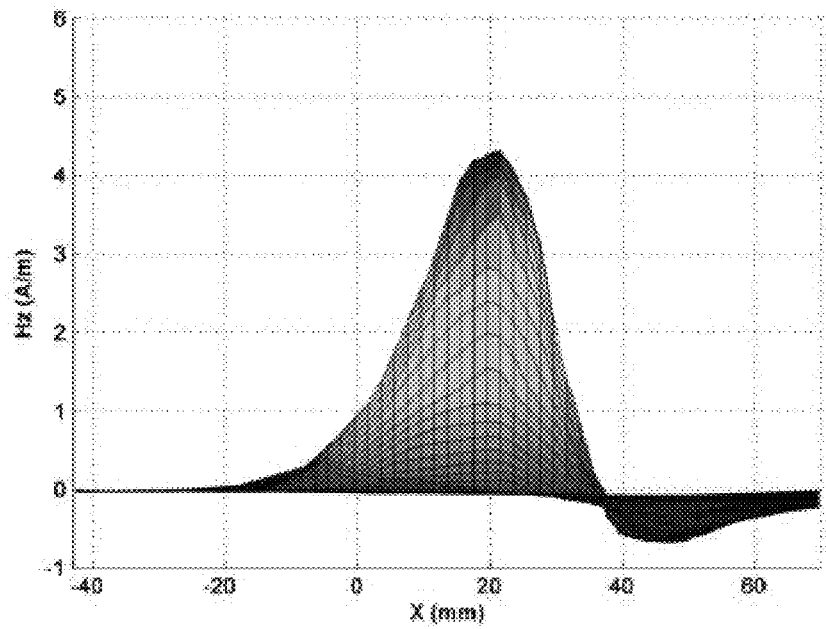
FIG. 11 is a layout of the Hz components of the magnetic field at a position of 20 mm above the metal sheet in the Z axis direction in the case where the antenna system only has the first coil according to an embodiment of the present invention.

FIG. 10 is a layout of the Hz components of the magnetic field, at a position of 20 mm above the metal sheet in the Z axis direction, of the antenna system provided by the embodiment of the present invention. FIG. 11 is the layout of the Hz components of the magnetic field at a position of 20 mm above the metal sheet in the Z axis direction in the case where the antenna system provided by the embodiment of the present invention only has the first coil.

Comparing FIG. 10 and FIG. 11, it can be seen that the performance of the antenna system based on the NFC antenna monomer of the present invention is improved to a greater degree than the performance of the antenna system based on the Z-shaped NFC antenna monomer. Through comparing the Hz distribution, it is known that the rise is about 35%.

When the length-width-height ratio of the NFC antenna monomer and the turns of the first coil are unchanged, the antenna performance is improved as the turns of the second coil increase because the magnetic field B2 generated by the second coil will be strengthened in such situation. When the length-width-height ratio of the NFC antenna monomer changes, but the turns of the first coil and the second coil are unchanged, the improvement of the antenna performance varies with the ratio. For example, when the length-width ratio is relatively small or the height is increased, relatively speaking, the magnetic field B2 generated by the second coil will be strengthened, so the performance of the antenna system will be improved by a higher proportion. Besides, the Z-shaped dual ring winding type NFC antenna is directional, so when the antenna monomer is placed on the edge of other metal sheets, for example on the edge in the −X direction, the antenna monomer is required to be rotated by 180 DEG because only by doing so can the magnetic field generated by the eddy current on the metal sheet and the magnetic fields generated by the first coil and the second coil point in the same direction, thus fulfilling the aim of superposition in the same direction. All in all, it must be ensured that the magnetic field B3 generated by the eddy current on the metal sheet and the magnetic fields B1 and B2 generated by the first coil and the second coil are in the same direction. In order to avoid mistakes in actual use, as in the majority of chips, a mark can be printed in a corner of the upper surface (for example, along the X axis direction) of the antenna monomer.

In the embodiment, along the length direction (namely X direction), the inner end of the Z-shaped dual ring winding type NFC antenna is disposed directly above the metal sheet 50, while the outer end of the Z-shaped dual ring winding type NFC antenna is disposed outside the metal sheet 50. Optimally, the outer end of the antenna can also be placed at a position overlapped with the edge of the metal sheet. In such circumstances, the magnetic field components vertical to the long axis direction can be effectively superposed, in the same direction, with the magnetic field generated by the eddy current which is coupled by the antenna coil on the metal sheet 50, thus improving the performance of the whole antenna system.

In other embodiments, the antenna system can also be formed by a plurality of Z-shaped dual ring winding type NFC antennas in mutual series connection. The plurality of Z-shaped dual ring winding type NFC antennas in mutual series connection are respectively placed on the metal sheet 50. By such mutual series connection means, it is ensured that the eddy loops generated by all the Z-shaped dual ring winding type NFC antennas on the metal sheet 50 are the same, so the strength of the eddy loops generated on the metal sheet 50 increases as the number of the Z-shaped dual ring winding type NFC antennas in series connection increases. Therefore, the performance of the antenna system will be improved as the number of the surface mounted type NFC antennas in mutual series connection included in the antenna system increases.

The ferrite core 1 is made of low-loss magnetic materials with magnetic conductivity greater than 100. The three-dimensional ferrite core 1 has six outer surfaces, namely an upper outer surface (+Z direction), a left outer surface (+Y direction), a lower outer surface (−Z direction), a right outer surface (−Y direction), a front outer surface (−X direction), and a rear outer surface (+X direction). As shown in FIG. 1, the ferrite core 1 is constituted by six layers (namely plate-like ferrite units 1a, 1b, 1c, 1d, 1e and 1f); and the first coil 2 of the antenna is wound along the upper surface, left surface, lower surface and right surface of the ferrite core 1 in a Z shape. As shown in FIG. 1, similar to the processing of ceramic antennas based on LTCC technology, all wires on the X-Y planes are made by silk printing metallic paste (for example, gold paste, silver paste or copper paste), and all wires (namely through-holes) along the Z direction are formed by boring holes on all layers, pouring paste into the through-holes and finally sintering the paste at a high temperature. As shown in FIG. 1, although the wiring of the second coil on the left and right sides of the ferrite core 1 is on the outer side of the through-hole of the first coil, the wiring can also be distributed on the inner side of the through-hole of the first coil. At present, the accuracy of the width of the silk printed wires and the diameter of the through-hole is very high and can be controlled within a scope of 0.1 mm, so the influences of the two-layer structure, which is formed by the through-hole of the first coil and the wiring of the second coil on the left and right sides of the ferrite core, on the overall size of the periphery of common surface mounted type NFC antenna can be neglected. Besides, in order to increase the turns of the second coil, the surface of the layer such as the layer 1b (or 1c, 1d, 1e) can be printed with dual-turn coils. Moreover, the antenna coil is connected with the outer parts through the through-hole electrodes 5a and 5b on the insulating layer 4 which connect the two end points of the antenna coil and the electrodes 6a and 6b on the lower surface of the insulating layer. Electrodes 6a and 6b have two roles: one is to connect two feed points of the antenna exciting source on the PCB, and the other is to weld the antenna and the PCB. This is why the antenna is called a surface mounted type NFC antenna.

The first coil 2 includes a plurality of parallel wire conductors on each of the left part, right part, upper part and lower bottom; the wire conductors on the left face, right face, upper face and lower face, are connected with the through-hole conductors in turn, forming shaft windings at an included angle of 90+θ between the rotating shaft direction and the X axis direction of the ferrite core.

The above embodiments are only preferable embodiments of the present invention and shall not be regarded as limits of the present invention. Any modifications, equivalent changes and improvement made within the spirit and principle of the present invention shall fall within the protective scope of the present invention.

EXPLANATION OF MARKS

Ferrite core: 1
Magnetic body layers (1f can be non-magnetic body layer): 1a, 1b, 1c, 1d, 1e, 1f
Conductor patterns of the first coil: 21a, 21b, 24a, 24b
Through-hole conductors of the first coil: 21Va, 21Vb, 21Vc, 21Vd, 24Va, 24Vb, 24Vc
Conductor patterns of the first coil: 21Pa, 21Pb, 24Pa, 24Pb
Conductor patterns of the second coil: 31, 32, 33, 34
Through-hole conductors of the second coil: 31Va, 32Va, 33Va, 34Va
Insulator layer: 4
Through-hole electrodes: 5a, 5b; external electrodes: 6a, 6b
Metal sheet—50 Base material: 60
Current of the first coil: a; Current of the second coil: b
Eddy current of the metal sheet: c
Magnetic field components of the first coil: A, A' B1, B1'
Magnetic field components of the second coil: B2, B2'
Magnetic field generated by the eddy current on the metal sheet: B3

The invention claimed is:

1. A Z-shaped dual ring winding type NFC antenna, characterized by comprising a ferrite core which is formed by superposing a plurality of plate-like ferrite units and extends along an X-Y plane, and two NFC antenna coils, namely a first coil and a second coil which are mutually connected and are wounded on the ferrite core; wherein the first coil is wound on the outer surface of the ferrite core in a Z shape along the projection direction of a Y axis; the second coil is spirally wound along the vertical Z axis direction; the lower end of the ferrite core is connected with an antenna insulating layer; the lower end face of the antenna insulating layer is connected with external electrodes that include a first external electrode and a second external electrode; the head end of the first coil are connected with the first external electrode, while the tail end is connected with the head end of the second coil through a connecting conductor; the tail end of the second coil is connected with the second external electrode; wherein the first coil comprises a plurality of bottom wire conductors which are positioned on the lower surface of the bottom plate-like ferrite unit and close to the end portion of the −X axis, a plurality of top wire conductors which are positioned on the upper surface of the top plate-like ferrite unit and close to the end portion of the +X axis, a plurality of left wire conductors which connect the left end portions of the bottom wire conductors and the left end portions of the top wire conductors, and a plurality of right wire conductors which connect the right end portions of the bottom wire conductors and the right end portions of the top wire conductors; wherein the left wire conductors are formed by left conductors or left conductive holes that penetrate the left through-holes near the left ends of the bottom plate-like ferrite unit, the middle plate-like ferrite units and the top plate-like ferrite unit, and a first wire which is disposed near the left ends of the middle plate-like ferrite units; wherein the right wire conductors are formed by right conductors or left conductive holes that penetrate the right through-holes near the right ends of the bottom plate-like ferrite unit, the middle plate-like ferrite units and the top plate-like ferrite unit, and a second wire which is disposed near the right ends of the middle plate-like ferrite units; wherein the second coil includes a plurality of coil bodies which are disposed on the upper surface of the second bottom plate-like ferrite unit, the upper surfaces and/or the lower surfaces of the middle plate-like ferrite units; one end of each of the coil bodies on the bottom plate-like ferrite unit is a tail end, and is connected with the first external electrode, while the other end is a head end, connected with the tail end of each of the coil bodies on the second bottom plate-like ferrite unit through a vertical connecting conductor or a conductive through-hole which is disposed on a lateral side of the second bottom plate-like ferrite unit; the rest is done in a similar way until the head end of the top coil body is connected with the tail end of the first coil through the vertical connecting conductor or the conductive through-hole disposed on a lateral side of the top plate-like ferrite unit, wherein one or more turns of the coil bodies are disposed on the same surface.

2. The Z-shaped dual ring winding type NFC antenna according to claim 1, wherein the antenna insulating layer is provided with two through-hole electrodes for connecting the NFC antenna coils and the external electrodes; the through-hole electrodes are connected with the NFC antenna coils; the two through-hole electrodes are correspondingly disposed on the first external electrode and the second external electrode; the through-hole electrode on the first external electrode and the through-hole electrode on the second external electrode are respectively connected with the head end of the first coil and the tail end of the second coil.

3. The Z-shaped dual ring winding type NFC antenna according to claim 2, wherein the first coil and the second coil are superposed on the left face and on the right face and are disposed in a staggered way; on the left face and right face, the first coil is positioned on the outer side, while the second coil is positioned on the inner side; or the first coil is positioned on the inner side, while the second coil is positioned on the outer side.

4. An antenna system, characterized by comprising the Z-shaped dual ring winding type NFC antenna according to claim 3, a substrate and a metal sheet, wherein the metal sheet is placed on the substrate, and the Z-shaped dual ring winding type NFC antenna is positioned on the metal sheet.

5. An antenna system, characterized by comprising the Z-shaped dual ring winding type NFC antenna according to claim 2, a substrate and a metal sheet, wherein the metal sheet is placed on the substrate, and the Z-shaped dual ring winding type NFC antenna is positioned on the metal sheet.

6. The Z-shaped dual ring winding type NFC antenna according to claim 1, wherein the first coil includes a plurality of parallel conductor wires on each of the left side, right side, upper side and lower side; the conductor wires on the left side, right side, upper side and lower side are connected with the through-hole conductors in turn to form axial windings at an angle of (90+θ) between the rotating shaft direction and the X axis direction of the ferrite core, wherein when the conductors of the first coil positioned on the bottom layer and the top layer of the ferrite core are mutually connected by using a straight line on the left side or right side of the ferrite, θ is the included angle between the straight line and the X axis.

7. The Z-shaped dual ring winding type NFC antenna according to claim 6, wherein the first coil and the second coil are superposed on the left face and on the right face and are disposed in a staggered way; on the left face and right face, the first coil is positioned on the outer side, while the second coil is positioned on the inner side; or the first coil is positioned on the inner side, while the second coil is positioned on the outer side.

8. An antenna system, characterized by comprising the Z-shaped dual ring winding type NFC antenna according to claim 7, a substrate and a metal sheet, wherein the metal sheet is placed on the substrate, and the Z-shaped dual ring winding type NFC antenna is positioned on the metal sheet.

9. An antenna system, characterized by comprising the Z-shaped dual ring winding type NFC antenna according to claim 6, a substrate and a metal sheet, wherein the metal sheet is placed on the substrate, and the Z-shaped dual ring winding type NFC antenna is positioned on the metal sheet.

10. The Z-shaped dual ring winding type NFC antenna according to claim 1, wherein the bottom wire conductors of the second coil are placed on the surface where the bottom wire conductors of the first coil are placed; the top wire conductors of the second coil are placed on the surface where the top wire conductors of the first coil are placed; and/or, the wire conductors of the bottom plate-like ferrite unit of the first coil are placed on the upper surface of the bottom plate-like ferrite unit, and then the bottom plate-like ferrite unit is replaced by an insulator layer made of non-ferrite materials.

11. The Z-shaped dual ring winding type NFC antenna according to claim 10, wherein the first coil and the second coil are superposed on the left face and on the right face and are disposed in a staggered way; on the left face and right face, the first coil is positioned on the outer side, while the second coil is positioned on the inner side; or the first coil is positioned on the inner side, while the second coil is positioned on the outer side.

12. An antenna system, characterized by comprising the Z-shaped dual ring winding type NFC antenna according to claim 11, a substrate and a metal sheet, wherein the metal sheet is placed on the substrate, and the Z-shaped dual ring winding type NFC antenna is positioned on the metal sheet.

13. An antenna system, characterized by comprising the Z-shaped dual ring winding type NFC antenna according to claim 10, a substrate and a metal sheet, wherein the metal sheet is placed on the substrate, and the Z-shaped dual ring winding type NFC antenna is positioned on the metal sheet.

14. The Z-shaped dual ring winding type NFC antenna according to claim 1, wherein the first coil and the second coil are superposed on the left face and on the right face and are disposed in a staggered way; on the left face and right face, the first coil is positioned on the outer side, while the second coil is positioned on the inner side; or the first coil is positioned on the inner side, while the second coil is positioned on the outer side.

15. An antenna system, characterized by comprising the Z-shaped dual ring winding type NFC antenna according to claim 14, a substrate and a metal sheet, wherein the metal sheet is placed on the substrate, and the Z-shaped dual ring winding type NFC antenna is positioned on the metal sheet.

16. An antenna system, characterized by comprising the Z-shaped dual ring winding type NFC antenna according to claim 1, a substrate and a metal sheet, wherein the metal sheet is placed on the substrate, and the Z-shaped dual ring winding type NFC antenna is positioned on the metal sheet.

17. The antenna system according to claim 16, wherein along the length direction, the inner end of the Z-shaped dual ring winding type NFC antenna is disposed directly above the metal sheet, and the outer end of the Z-shaped dual ring winding type NFC antenna is disposed outside the metal sheet; or the outer end of the antenna is disposed at a position overlapped with the edge of the metal sheet.

18. The antenna system according to claim 17, wherein the antenna system has a plurality of Z-shaped dual ring winding type NFC antennas in mutual series connection, and the plurality of Z-shaped dual ring winding type NFC antennas in mutual series connection are respectively disposed on the metal sheet.

19. The antenna system according to claim 17, wherein the metal sheet is rectangular, and four Z-shaped dual ring winding type NFC antennas are provided, respectively disposed on four sides of the metal sheet.

20. A method for processing the Z-shaped dual ring winding type NFC antennas according to claim 1, characterized in that, all coil bodies of the ferrite core on the X-Y plane are manufactured by the process of silk printing metallic paste, wherein conductive through-holes and conductive holes are bored on all related layers along the Z axis direction, and then the paste is poured into the holes and finally sintered at a high temperature; and the metallic paste is gold paste, silver paste or copper paste.

* * * * *